United States Patent
Wu et al.

(10) Patent No.: US 10,057,424 B2
(45) Date of Patent: Aug. 21, 2018

(54) METHOD FOR VOICE CALLING, METHOD FOR VOICE PLAYING AND DEVICES THEREOF

(71) Applicant: Xiaomi Inc., Beijing (CN)

(72) Inventors: Ming Wu, Beijing (CN); Yuan Zhan, Beijing (CN); Dongfang Ji, Beijing (CN); Bin Wang, Beijing (CN); Zhiguang Zheng, Beijing (CN)

(73) Assignee: Xiaomi Inc., Beijing (CN)

( * ) Notice: Subject to any disclaimer, the term of this patent is extended or adjusted under 35 U.S.C. 154(b) by 0 days.

(21) Appl. No.: 14/385,819

(22) PCT Filed: Jul. 24, 2014

(86) PCT No.: PCT/CN2014/082916
§ 371 (c)(1),
(2) Date: Sep. 17, 2014

(87) PCT Pub. No.: WO2015/149456
PCT Pub. Date: Oct. 8, 2015

(65) Prior Publication Data
US 2017/0013134 A1 Jan. 12, 2017

(30) Foreign Application Priority Data
Apr. 2, 2014 (CN) .......................... 2014 1 0131152

(51) Int. Cl.
*H04M 1/64* (2006.01)
*H04M 3/533* (2006.01)
(Continued)

(52) U.S. Cl.
CPC ........ *H04M 3/53366* (2013.01); *H04L 51/04* (2013.01); *H04M 1/605* (2013.01);
(Continued)

(58) Field of Classification Search
CPC ...... H04L 67/04; H04L 67/18; H04M 1/7253; H04M 1/72558; H04M 2250/10; H04W 4/02
(Continued)

(56) References Cited

U.S. PATENT DOCUMENTS 8,483,101 B2 7/2013 Albert et al.
2005/0239487 A1 10/2005 Glass et al.
(Continued)

FOREIGN PATENT DOCUMENTS

CN 101079836 A 11/2007
CN 102340599 A 2/2012
(Continued)

OTHER PUBLICATIONS

Office Action dated Jun. 12, 2017 for Mexican Application No. MX/a/2014/011219, 6 pages.
(Continued)

*Primary Examiner* — Solomon Bezuayehu
(74) *Attorney, Agent, or Firm* — Brinks, Gilson & Lione

(57) ABSTRACT

This disclosure describes a method for voice calling, voice playing, and devices thereof, in the field of communication. The method for voice calling includes: detecting whether a sensed distance value of an on-site terminal is less than a preset threshold, entering a predetermined call mode if the sensed distance value is less than the preset threshold, auto-playing a voice signal of an opposite terminal in the predetermined call mode, and if a voice signal of the on-site terminal is detected in the predetermined call mode, collecting the voice signal of the on-site terminal, and transmitting the voice signal of the on-site terminal to the opposite terminal.

11 Claims, 6 Drawing Sheets

(51) Int. Cl.
*H04L 12/58* (2006.01)
*H04M 1/60* (2006.01)
*H04M 1/725* (2006.01)
*H04M 11/00* (2006.01)

(52) U.S. Cl.
CPC ..... *H04M 1/7255* (2013.01); *H04M 1/72569* (2013.01); *H04M 3/53333* (2013.01); *H04M 2203/2094* (2013.01); *H04M 2203/256* (2013.01)

(58) Field of Classification Search
USPC .......................................... 379/88.01–88.19
See application file for complete search history.

(56) References Cited

U.S. PATENT DOCUMENTS

| | | | |
|---|---|---|---|
| 2007/0274297 A1 | 11/2007 | Cross, Jr. et al. | |
| 2008/0043759 A1 | 2/2008 | Poetker et al. | |
| 2008/0207115 A1* | 8/2008 | Lee | H04M 1/7253 455/3.06 |
| 2009/0104915 A1 | 4/2009 | Katis et al. | |
| 2009/0327422 A1 | 12/2009 | Katis et al. | |
| 2010/0205262 A1* | 8/2010 | Peterson | G06Q 30/02 709/206 |
| 2011/0311204 A1* | 12/2011 | Adimatyam | H04N 5/44543 386/295 |
| 2012/0029917 A1 | 2/2012 | Chang et al. | |
| 2012/0114108 A1 | 5/2012 | Katis et al. | |
| 2013/0315107 A1 | 11/2013 | Lindner et al. | |
| 2015/0086055 A1 | 3/2015 | Kato | |

FOREIGN PATENT DOCUMENTS

| | | | |
|---|---|---|---|
| CN | 102710920 | A | 10/2012 |
| CN | 102833414 | A | 12/2012 |
| CN | 103167122 | A | 6/2013 |
| CN | 103167123 | A | 6/2013 |
| CN | 103369094 | A | 10/2013 |
| CN | 103414500 | A | 11/2013 |
| CN | 103475499 | A | 12/2013 |
| CN | 203340289 | U | 12/2013 |
| CN | 103581424 | A | 2/2014 |
| JP | 2003-37652 | A | 2/2003 |
| JP | 2005-45655 | A | 2/2005 |
| JP | 2005-535012 | A | 11/2005 |
| JP | 2007-534225 | A | 11/2007 |
| JP | 2009-521745 | A | 6/2009 |
| JP | 2012-10183 | A | 1/2012 |
| JP | 2013-236201 | A | 11/2013 |
| KR | 10-2009-0113801 | A | 11/2009 |
| KR | 10-1571993 | B1 | 11/2015 |
| RU | 2 120 192 | C1 | 10/1998 |
| WO | WO 98/15098 | A1 | 4/1998 |
| WO | WO 2013/180087 | A1 | 12/2013 |

OTHER PUBLICATIONS

International Search Report and Written Opinion dated Jan. 6, 2015 for International Application No. PCT/CN2014/082916, 10 pages.
English Translation of International Search Report dated Jan. 6, 2015 for International Application No. PCT/CN2014/082916, 6 pages.
Extended European Search Report dated Sep. 1, 2015 for European Application No. 15155477.1, 6 pages.
Hinckley, Ken et al., "Foreground and Background Interaction with Sensor-Enhanced Mobile Devices," ACM-Transactions on Computer-Human Interaction, vol. 12, No. 1, 2005, 22 pages.
Hinckley, Ken et al., "Toward More Sensitive Mobile Phones," Proceedings of the 14th Annual ACM Symposium on User Interface Software and Technology, UIST'01, 2001, 2 pages.
Office Action dated Sep. 9, 2015 for Chinese Application No. 201410131152.5, 9 pages.
Office Action dated May 10, 2016 for Japanese Application No. 2016-510933, 4 pages.
Office Action dated Sep. 13, 2016 for Japanese Application No. 2016-510933, 3 pages.
Office Action dated Jun. 23, 2015 for Korean Application No. 10-2014-7026648, 6 pages.
Office Action dated Dec. 5, 2016 for Russian Application No. 2015130838/08, 18 pages.

* cited by examiner

METHOD FOR VOICE CALLING, METHOD FOR VOICE PLAYING AND DEVICES THEREOF

This application is a National Phase Application of International Application No. PCT/CN2014/082916, filed Jul. 24, 2014, which is based upon and claims priority to Chinese Patent Application No. 201410131152.5, filed Apr. 2, 2014, the entire contents of which are incorporated herein by reference.

TECHNICAL FIELD

The present disclosure relates to the field of communication, and more particularly, to a method for voice calling, a method for voice playing and devices thereof.

BACKGROUND

Currently, domestic operating agencies do not permit Internet service providers to provide two-way voice call service, such as network phone service, in China, but allow Internet service providers to provide one-way voice call service, such as network interphone service, in China.

The function of network interphone may be provided by social application clients in terminals. During a voice call, a user "A" presses an intercom button on an interface of a social application client "A," then issues a voice of call; the social application client "A" records the voice signal during the press of the intercom button, and then transmits the voice signal to a social application client "B" after the recording is completed. After receiving the voice signal, the social application client "B" displays an unread voice signal on its interface, a user "B" clicks the unread voice signal on the interface of the social application terminal "B," and then the social application client "B" plays the voice signal through a speaker.

During the implementation of the present disclosure, the inventor finds at least the following defects existing in the above-mentioned manner: when transmitting the voice signal, the user must press the intercom button continuously. When playing the voice signal, the user also needs to click the unread voice signal, and when it is inconvenient for a user to perform a press operation or a click operation on a terminal, the user is unable to use the network interphone service smoothly.

SUMMARY

In order to solve, in part, the problem that the user can not smoothly use the network interphone service when it is inconvenient for the user to perform a press operation or a click operation on the terminal, the present disclosure provides a method for voice calling, a method for voice playing and devices thereof. The technical solutions are as follows.

According to a first aspect of the present disclosure, there is provided a method for voice calling, the method includes:

detecting whether a sensed distance value of an on-site terminal is smaller than a preset threshold;

entering a predetermined call mode if it is detected that the sensed distance value is smaller than the preset threshold;

auto-playing a voice signal of an opposite terminal in the predetermined call mode; and when a voice signal of the on-site terminal is detected in the predetermined call mode, collecting the voice signal of the on-site terminal, and transmitting the voice signal of the on-site terminal to the opposite terminal.

According to a second aspect of the embodiments of the present disclosure, there is provided a method for voice playing, the method includes:

detecting whether a sensed distance value of an on-site terminal is smaller than a preset threshold;

if it is detected that the sensed distance value is smaller than the preset threshold, entering a predetermined play mode; and auto-playing a voice signal of an opposite terminal in the predetermined play mode.

According to a third aspect of the embodiments of the present disclosure, there is provided a device for voice calling, the device includes:

a processor;

a memory storing instructions executable by the processor;

wherein the processor is configured to:

detect whether a sensed distance value of an on-site terminal is smaller than a preset threshold;

enter a predetermined call mode if it is detected that the sensed distance value is smaller than the preset threshold;

auto-play a voice signal of an opposite terminal in the predetermined call mode; and if the voice signal of the on-site terminal is detected in the predetermined call mode, collect the voice signal of the on-site terminal, and transmit the voice signal of the on-site terminal to the opposite terminal.

According to a fourth aspect of the embodiments of the present disclosure, there is provided a device for voice playing, the device includes:

a processor;

a memory storing instructions executable by the processor;

wherein the processor is configured to:

detect whether a sensed distance value of an on-site terminal is smaller than a preset threshold;

enter a predetermined play mode when it is detected that the sensed distance value is smaller than the preset threshold; and auto-play a voice signal of an opposite terminal in the predetermined play mode.

According to a fifth aspect of the embodiments of the present disclosure, there is provided a non-transitory readable storage medium including instructions, executable by a processor in a terminal, for performing a method for voice calling, the method including:

detecting whether a sensed distance value of the terminal is smaller than a preset threshold;

entering a predetermined call mode if it is detected that the sensed distance value is smaller than the preset threshold;

auto-playing a voice signal of an opposite terminal in the predetermined call mode; and when a voice signal of the terminal is detected in the predetermined call mode, collecting the voice signal of the terminal, and transmitting the voice signal of the terminal to the opposite terminal.

According to a sixth aspect of the embodiments of the present disclosure, there is provided a non-transitory readable storage medium including instructions, executable by a processor in a terminal, for performing a method for voice calling, the method including:

detecting whether a sensed distance value of the terminal is smaller than a preset threshold;

if it is detected that the sensed distance value is smaller than the preset threshold, entering a predetermined play mode; and auto-playing a voice signal of an opposite terminal in the predetermined play mode.

The technical schemes provided by the embodiments of the present disclosure have, in part, the following beneficial effects:

By entering the predetermined call mode when detecting that the sensed distance value is smaller than the preset threshold; auto-playing the voice signal of the opposite terminal in the predetermined call mode; and when the voice signal of the on-site terminal is detected in the predetermined call mode, collecting the voice signal of the on-site terminal, and transmitting the voice signal of the on-site terminal to the opposite terminal, the problem that the user can not smoothly use the network interphone services when it is inconvenient for the user to perform a press operation or a click operation on the terminal is solved, the effects that voice playing and voice collecting of the network interphone can be automatically triggered as long as the user puts the terminal close to his ear, and the network interphone can be used without any other operation are achieved, and a user experience of an approximate two-way conversation can be obtained.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

In order to make the purposes, the technical solutions and the advantages of the present disclosure more apparent, the present disclosure will be further described in detail below with reference to the accompanying drawings. It is apparent that the described embodiments are only a part of embodiments of the present disclosure, but not all the embodiments. All the other embodiments obtained by the person skilled in the art without inventive labor belong to the protection scope of the present disclosure.

Figure 1:
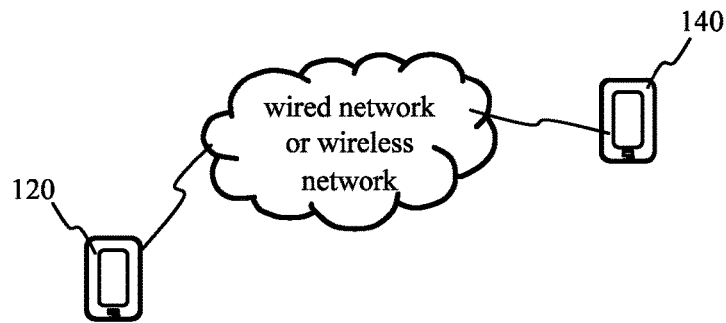
FIG. 1 is a block diagram illustrating an implementation environment related to the method for voice calling shown in respective exemplary embodiments of the present disclosure.

FIG. 1 is a block diagram showing an implementation environment related to the method for voice calling shown in respective exemplary embodiments of the present disclosure. The implementation environment includes an on-site terminal 120 and an opposite terminal 140.

The on-site terminal 120 may be a mobile phone, a tablet PC, an e-book reader, a MP3 (Moving Picture Experts Group Audio Layer III) player, a MP4 (Moving Picture Experts Group Audio Layer IV) player, etc. A client, which is a client with a one-way voice call function such as network interphone function, runs in the on-site terminal 120. A distance sensor for collecting the sensed distance value in front of a screen of the on-site terminal 120 is also provided in the on-site terminal 120.

The on-site terminal 120 may make a one-way voice call with the opposite terminal 140 via a wired network or a wireless network.

The opposite terminal 140 may be a mobile phone, a tablet PC, an e-book reader, a MP3 (Moving Picture Experts Group Audio Layer III) player, a MP4 (Moving Picture Experts Group Audio Layer IV) player, etc. A client, which is a client with a one-way voice call function such as network interphone function, also runs in the opposite terminal 140. A distance sensor for collecting the sensed distance value in front of a screen of the opposite terminal 140 is also provided in the opposite terminal 140.

The above-mentioned client may be a social client having both the instant messaging function and the one-way voice call function, similar to WeChat client provided by Tencent Technology Co., Ltd., China, Mi-talk client provided by Xiaomi Inc., China, Laiwang client provided by Alibaba company, China, and Line client provided by South Korea Internet Group NHN.

Figure 2:
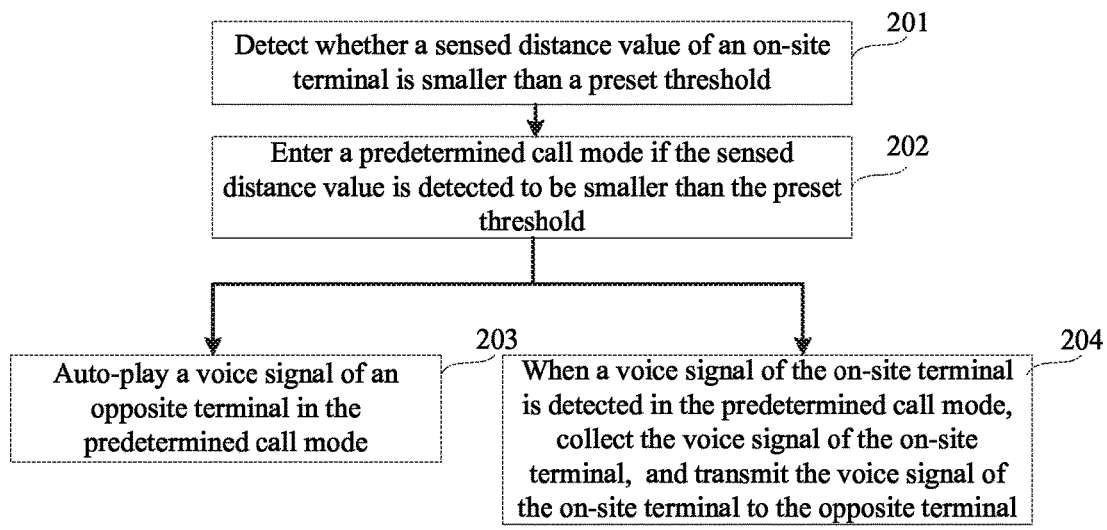
FIG. 2 is a flow chart illustrating the method for voice calling according to an exemplary embodiment.

FIG. 2 is a flow chart illustrating the method for voice calling according to an exemplary embodiment. This embodiment is illustrated by applying the method for voice calling to the on-site terminal in FIG. 1. The method for voice calling includes the following steps.

In step 201, whether a sensed distance value of an on-site terminal is smaller than a preset threshold is detected.

In step 202, a predetermined call mode is entered if it is detected that the sensed distance value is smaller than the preset threshold.

In step 203, in the predetermined call mode, a voice signal of an opposite terminal is auto-played.

In step 204, if a voice signal of the on-site terminal is detected in the predetermined call mode, the voice signal of the on-site terminal is collected, and the voice signal of the on-site terminal is transmitted to the opposite terminal.

In summary, in the method for voice calling provided by the present embodiment, by entering the predetermined call mode when detecting that the sensed distance value is smaller than the preset threshold; auto-playing the voice signal of the opposite terminal in the predetermined call mode; and when the voice signal of the on-site terminal is detected in the predetermined call mode, collecting the voice signal of the on-site terminal, and transmitting the voice signal of the on-site terminal to the opposite terminal, the problem that the user can not smoothly use the network interphone when it is inconvenient for the user to perform a press operation or a click operation on the terminal is solved, the effects that voice playing and voice collecting of the network interphone can be automatically triggered as long as the user puts the terminal close to his ear, and the network interphone can be used without any other operation are achieved, and a user experience of an approximate two-way conversation can be obtained.

Figure 3A:
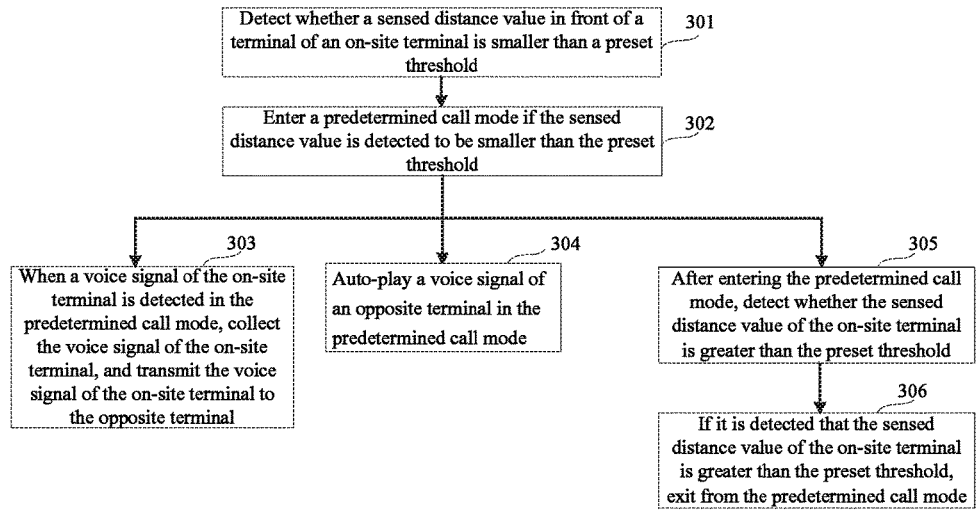
FIG. 3A is a flow chart illustrating the method for voice calling according to another exemplary embodiment.

FIG. 3A is a flow chart illustrating the method for voice calling according to another exemplary embodiment. This embodiment is illustrated by applying the method for voice calling to the on-site terminal in FIG. 1. The method for voice calling includes the following steps.

In step 301, whether a sensed distance value of an on-site terminal is smaller than a preset threshold is detected.

The on-site terminal obtains the sensed distance value in front of the terminal through a built-in distance sensor. The distance sensor is usually provided on a location at the top of a screen of the on-site terminal and near a handset.

When a client with a one-way voice call function in the on-site terminal is operating, the on-site terminal detects whether the sensed distance value is smaller than the preset threshold every preset time interval. The preset threshold may be set by research personnel in accordance with experimental values or empirical values. For example, if the on-site terminal is a mobile phone, the research personnel may obtain the preset threshold via statistical analysis by repeatedly collecting the sensed distance values between the mobile phone and the user's ear during the phone call.

In step 302, if it is detected that the sensed distance value is smaller than the preset threshold, a predetermined call mode is entered.

If the on-site terminal detects that the sensed distance value is smaller than the preset threshold, the on-site terminal is considered to be put on a position close to the user's ear, and the on-site terminal enters the predetermined call mode. The predetermined call mode is a mode provided by the present embodiment that is able to properly use the one-way call function without clicking an operation signal on the screen of the terminal by the user.

If the on-site terminal detects that the sensed distance value is greater than the preset threshold, then the on-site terminal is considered to be not put on the position close to the user's ear, and the on-site terminal keeps in an ordinary call mode, i.e., the usage mode corresponding to the network interphone provided in the Background.

In step 303, when a voice signal of the on-site terminal is detected in the predetermined call mode, the voice signal of the on-site terminal is collected, and the voice signal of the on-site terminal is transmitted to the opposite terminal.

In the predetermined call mode, the on-site terminal automatically detects whether the voice signal of the on-site terminal exists, and if the user issues a voice, the on-site terminal may detect the voice signal of the on-site terminal, then automatically collect the voice signal of the on-site terminal, and send the voice signal of the on-site terminal to the opposite terminal by using the one-way voice call function. This process does not require the user's other operations, and is completed automatically by the on-site terminal.

In one possible way of implementation, if the on-site terminal is playing a voice signal of the opposite terminal, and the voice signal of the on-site terminal is detected, the on-site terminal still collects the voice signal of the on-site terminal, and transmits the voice signal of the on-site terminal to the opposite terminal. Namely, whether the on-site terminal is playing the voice signal of the opposite terminal has no influence on the collection of the voice signal of the on-site terminal.

In step 304, the voice signal of the opposite terminal is played directly in the predetermined call mode.

In the predetermined call mode, the on-site terminal directly uses the handset to play the voice signal of the opposite terminal, without the user's other operations. The voice signal of the opposite terminal is a network voice signal sent by the opposite terminal by using the one-way voice call function, other than the voice signal sent by using the two-way voice call function or the voice signal sent by using the conventional mobile call.

There are two ways to implement this step.

First, in the predetermined call mode, the voice signal of the opposite terminal that has been received but not yet played is auto-played.

Namely, before entering the predetermined call mode, the on-site terminal has received the voice signal of the opposite terminal, and displayed it as an unread voice signal of the opposite terminal. Thereafter, the on-site terminal enters the predetermined call mode, and thus the on-site terminal auto-plays the voice signal of the opposite terminal that has been received but not yet played.

Second, in the predetermined call mode, the voice signal of the opposite terminal is received; and the received voice signal of the opposite terminal is auto-played.

After entering the predetermined call mode, the on-site terminal receives the voice signal of the opposite terminal, then the on-site terminal auto-plays the received voice signal of the opposite terminal by using the handset.

As one possible way of implementation, the on-site terminal receiving the voice signal of the opposite terminal in the predetermined call mode includes following step.

If the on-site terminal receives a text information of the opposite terminal, then the on-site terminal synthesizes a voice signal of the opposite terminal according to the text information of the opposite terminal.

Namely, during a process of using the one-way voice call, the opposite terminal may also send the text information to the on-site terminal. If the on-site terminal receives the text information of the opposite terminal in the predetermined call mode, then the on-site terminal synthesizes a voice signal of the opposite terminal according to the text information of the opposite terminal and the voice synthesis technology, and auto-plays the synthesized voice signal of the opposite terminal by using the handset, without the user's other operations.

In step 305, after entering the predetermined call mode, whether the sensed distance value of the on-site terminal is greater than the preset threshold is detected.

After entering the predetermined call mode, the on-site terminal detects whether the sensed distance value is greater than the preset threshold every preset time interval.

In step 306, if it is detected that the sensed distance value is greater than the preset threshold, the predetermined call mode is exited.

If it is detected that the sensed distance value is smaller than the preset threshold, the on-site terminal keeps in the predetermined call mode.

If it is detected that the sensed distance value is greater than the preset threshold, the on-site terminal exits from the predetermined call mode and then enters a normal mobile call mode. In the normal mobile call mode, if the on-site terminal receives the voice signal of the opposite terminal, the on-site terminal plays the voice signal of the opposite terminal only when receiving a trigger signal. In the conventional mobile call mode, only when the on-site terminal receives a signal of constantly pressing an intercom button, the on-site terminal collects the voice signal of the on-site terminal and sends it to the opposite terminal.

Figure 3B:
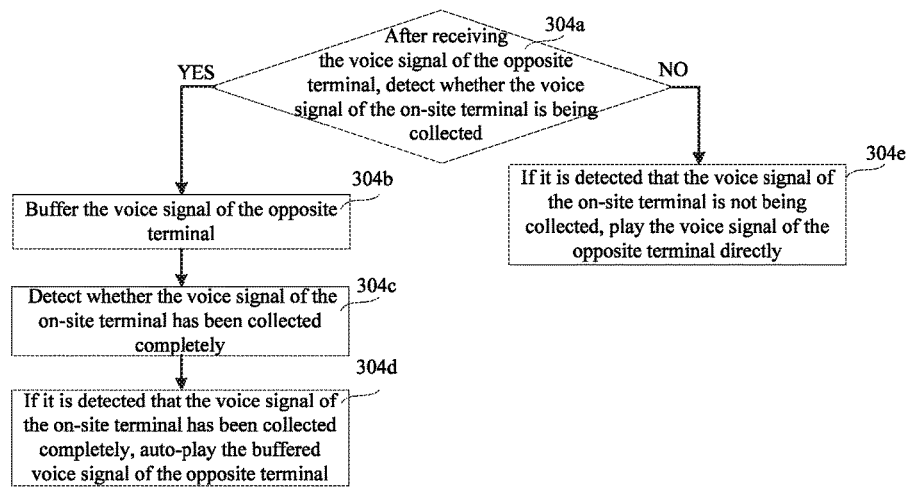
FIG. 3B is a flow chart illustrating one way of performing a step 303 in the embodiment shown in FIG. 3A.

It should be explained additionally that, the present embodiment also provides a mechanism for buffering the voice signal of the opposite terminal, as shown in FIG. 3B, for a second way of implementing step 304, the following sub-steps may be further included.

In step 304a, after receiving the voice signal of the opposite terminal, whether the voice signal of the on-site terminal is being collected is detected.

After receiving the voice signal of the opposite terminal, the on-site terminal may firstly detect whether the voice signal of the on-site terminal is being collected, namely, whether the user is talking. If it is detected that the voice signal of the on-site terminal is being collected, step 304b is entered; and if it is detected that the voice signal of the on-site terminal is not being collected, step 304e is entered.

In step 304b, if it is detected that the voice signal of the on-site terminal is being collected, the received voice signal of the opposite terminal is buffered.

If the on-site terminal detects that the voice signal of the on-site terminal is being collected, namely, the user is talking, the received voice signal of the opposite terminal is buffered, and is not played for the moment. The voice signal of the opposite terminal herein includes the voice signal of the opposite terminal directly sent by the opposite terminal, and also includes the voice signal of the opposite terminal synthesized by the on-site terminal according to the text information of the opposite terminal.

In step 304c, whether the collection of the voice signal of the on-site terminal has been completed is detected.

After buffering the voice signal of the opposite terminal, the on-site terminal detects whether the collection of the voice signal of the on-site terminal has been completed, namely, whether the user has stopped talking every preset time interval.

In order to ensure the accuracy of detection, the on-site terminal detects every preset time interval whether the collection of the voice signal of the on-site terminal has been completed and whether a time length after the collection has been completed reaches a preset time length, namely, whether the user has stopped talking, and the time of stopping talking exceeds the preset time length.

In step 304d, if it is detected that the collection of the voice signal of the on-site terminal has been completed, the buffered voice signal of the opposite terminal is auto-played.

If it is detected that the collection of the voice signal of the on-site terminal has been completed, the on-site terminal auto-plays the buffered voice signal of the opposite terminal. If the number of the buffered voice signals of the opposite terminal is more than one, the on-site terminal plays the voice signals of the opposite terminal one by one in an order of the buffer time from early to late.

In step 304e, if it is detected the voice signal of the on-site terminal is not being collected, the voice signal of the opposite terminal is played directly.

If it is detected that the voice signal of the on-site terminal is not collected in step 304a, the on-site terminal plays the voice signal of the opposite terminal directly.

It should be explained additionally that, after the on-site terminal entering the predetermined call mode, the on-site terminal sends a prompt information for prompting that the on-site terminal has entered the predetermined call mode to the opposite terminal, and the opposite terminal may receive and display the prompt information. Similarly, if the opposite terminal has entered the predetermined call mode, the on-site terminal receives the prompt information for prompting that the opposite terminal has entered the predetermined call mode sent from the opposite terminal, and then the on-site terminal displays the prompt information.

In summary, in the method for voice calling provided by the present embodiment, by entering the predetermined call mode when detecting that the sensed distance value is smaller than the preset threshold; auto-playing the voice signal of the opposite terminal in the predetermined call mode; and when the voice signal of the on-site terminal is detected in the predetermined call mode, collecting the voice signal of the on-site terminal, and transmitting the voice signal of the on-site terminal to the opposite terminal, the problem that the user can not smoothly use the network interphone when it is inconvenient for the user to perform a press operation or a click operation on the terminal is solved, the effects that voice playing and voice collecting of the network interphone can be automatically triggered as long as the user puts the terminal close to his ear, and the network interphone can be used without any other operation are achieved, and a user experience of an approximate two-way conversation can be obtained.

In the method for voice calling provided by the present embodiment, by synthesizing the received text information of the opposite terminal into the voice signal of the opposite terminal and playing it, even the opposite terminal sends the text information, the user can still obtain a user experience of an approximate two-way conversation, and the whole process does not require the user's other operations, thus improving communication efficiency.

In the method for voice calling provided by the present embodiment, by buffering the voice signal of the opposite terminal and/or the synthesized voice signal of the opposite terminal when collecting the voice signal of the on-site terminal; and playing the buffered voice signal of the opposite terminal only after the voice signal of the on-site terminal has been collected completely, the user may not be disturbed by any voice from the opposite side when talking, and it is also ensured that the present embodiment is still a one-way conversation other than a two-way conversation, which complies with the requirements to the operating agencies.

In one example, a user A and a user B use the clients in the terminals to perform a network intercom. The user A and the user B both put the terminal on a position close to their ears, thus the terminal A used by the user A and the terminal B used by the user B both enter the predetermined call mode. At this time, if the user A is talking, the terminal A may automatically collect the voice signal, and send it to the terminal B. After receiving the voice signal, the terminal B may auto-play the voice signal in a handset. If the user B is talking, the terminal B may automatically collect the voice signal, and send it to the terminal A. After receiving the voice signal, the terminal A auto-plays the voice signal in a handset. In this way, an effect of achieving an approximate two-way conversation by using a one-way conversation function is realized. If the terminal B sends a voice signal to the terminal A when the user A is talking, the terminal A may buffer the voice signal, and auto-play the voice signal after the user A has finished the talking, thus the conversation between the user A and the user B is not disturbed.

In another example, a user A and a user B use the clients in the terminals to perform a network intercom. The user A puts a terminal A on a position close to his ear, thus the terminal A used by the user A will enter the predetermined call mode; while the user B still uses a terminal B in a normal mode. At this time, if the user A is talking, the terminal A may automatically collect the voice signal, and send it to the terminal B. After receiving the voice signal, the terminal B firstly displays there is one piece of unread voice, then plays the voice signal only after receiving a clicking signal for the unread voice from the user B. If the user B is talking, the user B needs to press a prescribed physical button or a prescribed virtual key on the terminal B, then the terminal B may collect the voice signal of the user B, and send it to the terminal A. After receiving the voice signal, the terminal A auto-plays the voice signal in the handset. If the user B is inconvenient to talk, the user B may send a text information to the terminal A via the terminal B, the terminal A synthesizes the received text information into the voice signal, and then auto-plays the voice signal in the handset, thus the mixed input of text and voice may be achieved in the user B, and the user A's experience of an approximate two-way conversation may be realized.

Figure 4:
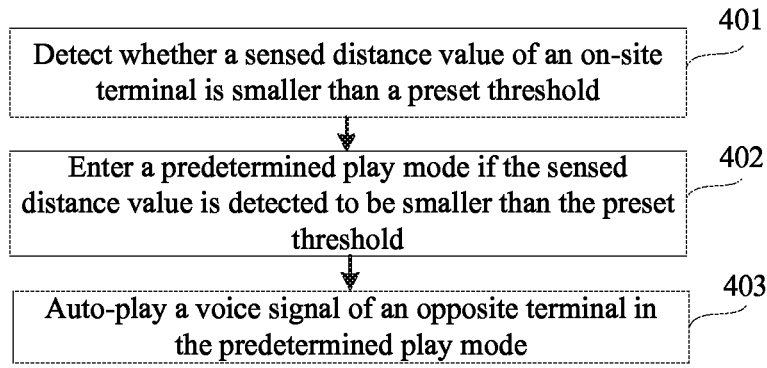
FIG. 4 is a flow chart illustrating the method for voice playing according to an exemplary embodiment.

FIG. 4 is a flow chart illustrating the method for voice playing according to an exemplary embodiment. This embodiment is illustrated by applying the method for voice playing to the on-site terminal in FIG. 1. The method for voice playing includes the following steps.

In step 401, whether a sensed distance value of an on-site terminal is smaller than a preset threshold is detected.

In step 402, if it is detected that the sensed distance value is smaller than the preset threshold, a predetermined play mode is entered.

In step 403, in the predetermined play mode, voice signal of an opposite terminal is auto-played.

In summary, in the method for voice playing provided by the present embodiment, by entering the predetermined call mode when detecting that the sensed distance value is smaller than the preset threshold; and auto-playing the voice signal of the opposite terminal in the predetermined call mode, the problem that the user can not smoothly use the network interphone when it is inconvenient for the user to perform a press operation or a click operation on the terminal is solved, and the effect that voice playing of the network interphone can be automatically triggered as long as the user puts the terminal close to his ear is achieved.

Figure 5:
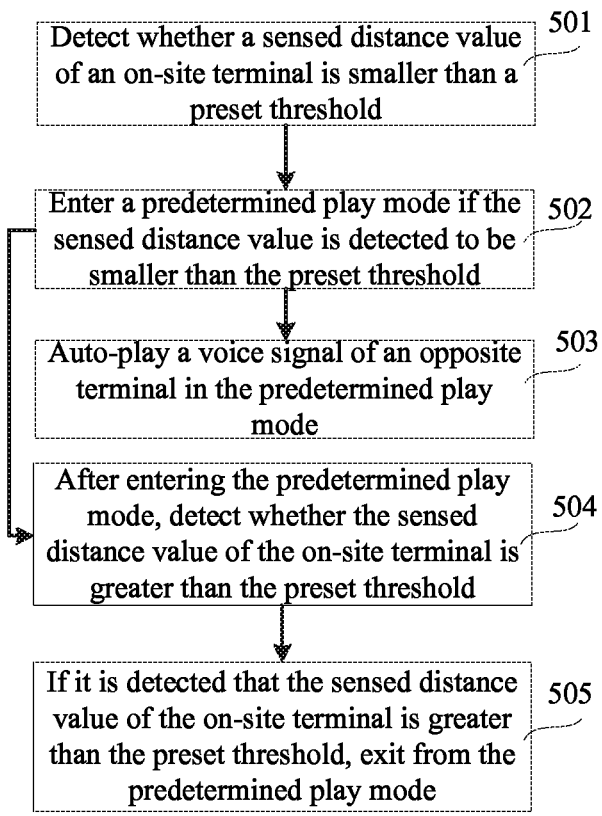
FIG. 5 is a flow chart illustrating the method for voice playing according to another exemplary embodiment.

FIG. 5 is a flow chart illustrating the method for voice playing according to an exemplary embodiment. This embodiment is illustrated by applying the method for voice playing to the on-site terminal in FIG. 1. The method for voice playing includes the following steps.

In step 501, whether a sensed distance value of an on-site terminal is smaller than a preset threshold is detected.

The on-site terminal obtains the sensed distance value in front of the terminal through a built-in distance sensor. The distance sensor is usually provided on a location at the top of the screen of the on-site terminal and near a handset.

When a client with a one-way voice call function in the on-site terminal is operating, the on-site terminal detects whether the sensed distance value is smaller than the preset threshold every preset time interval. The preset threshold may be set by research personnel in accordance with experimental values or empirical values. For example, if the on-site terminal is a mobile phone, the research personnel may obtain the preset threshold via statistical analysis by repeatedly collecting the sensed distance values between the mobile phone and the user's ear during the phone call.

In step 502, if it is detected that the sensed distance value is smaller than the preset threshold, the predetermined play mode is entered.

If the on-site terminal detects that the sensed distance value is smaller than the preset threshold, the on-site terminal is considered to be put on a location close to the user's ear, and the on-site terminal enters the predetermined play mode.

In step 503, in the predetermined play mode, the voice signal of the opposite terminal is auto-played.

In the predetermined play mode, the on-site terminal directly uses the handset to play the voice signal of the opposite terminal, without the user's other operations. The voice signal of the opposite terminal is a network voice signal sent by the opposite terminal by using the one-way voice call function, other than a voice signal sent by using the two-way voice call function or a voice signal sent by using the conventional mobile call.

There are two ways to implement this step.

First, in the predetermined play mode, the voice signal of the opposite terminal that has been received but not yet played is auto-played.

Namely, before entering the predetermined play mode, the on-site terminal has received the voice signal of the opposite terminal, and displayed it as an unread voice signal of the opposite terminal. Thereafter, the on-site terminal enters the predetermined play mode, and auto-plays the voice signal of the opposite terminal that has been received but not yet played.

Second, in the predetermined play mode, the voice signal of the opposite terminal is received; and the received voice signal of the opposite terminal is auto-played.

After entering the predetermined play mode, the on-site terminal receives the voice signal of the opposite terminal, then the on-site terminal auto-plays the received voice signal of the opposite terminal by using the handset.

As one possible way of implementation, the on-site terminal receiving the voice signal of the opposite terminal in the predetermined play mode includes following step.

If the on-site terminal receives a text information of the opposite terminal, then the on-site terminal synthesizes a voice signal of the opposite terminal according to the text information of the opposite terminal.

Namely, during a process of using the one-way voice call, the opposite terminal may also send the text information to the on-site terminal. If the on-site terminal receives the text information of the opposite terminal in the predetermined play mode, then the on-site terminal synthesizes the voice signal of the opposite terminal according to the text information of the opposite terminal and the voice synthesis technology, and auto-plays the synthesized voice signal of the opposite terminal by using the handset, without the user's other operations.

In step 504, after entering the predetermined play mode, whether the sensed distance value of the on-site terminal is greater than the preset threshold is detected.

After entering the predetermined play mode, the on-site terminal detects whether the sensed distance value is greater than the preset threshold every preset time interval.

In step 505, if it is detected that the sensed distance value is greater than the preset threshold, the predetermined play mode is exited.

If it is detected that the sensed distance value is smaller than the preset threshold, the on-site terminal keeps in the predetermined play mode.

If it is detected that the sensed distance value is greater than the preset threshold, the on-site terminal exits from the predetermined play mode and then enters a normal mobile play mode. In the normal mobile play mode, if the on-site terminal receives the voice signal of the opposite terminal, the on-site terminal plays the voice signal of the opposite terminal only when receiving a trigger signal.

In summary, in the method for voice playing provided by the present embodiment, by entering the predetermined call mode when detecting that the sensed distance value is smaller than the preset threshold; and auto-playing the voice signal of the opposite terminal in the predetermined play mode, the problem that the user can not smoothly use the network interphone when it is inconvenient for the user to perform a press operation or a click operation on the terminal is solved, and the effect that voice playing of the network interphone can be automatically triggered as long as the user puts the terminal close to his ear is achieved.

In the method for voice playing provided by the present embodiment, by generating the received text information of the opposite terminal into the synthesized voice signal and playing it, even the opposite terminal sends the text information, the user still can obtain a user experience of an approximate two-way conversation, and the whole process does not require the user's other operations, thus improving communication efficiency.

The following are device embodiments of the present disclosure, which may be configured to perform the method embodiments of the present disclosure. For the details not disclosed in the device embodiments of the present disclosure, the method embodiments of the present disclosure may be referred to.

Figure 6:
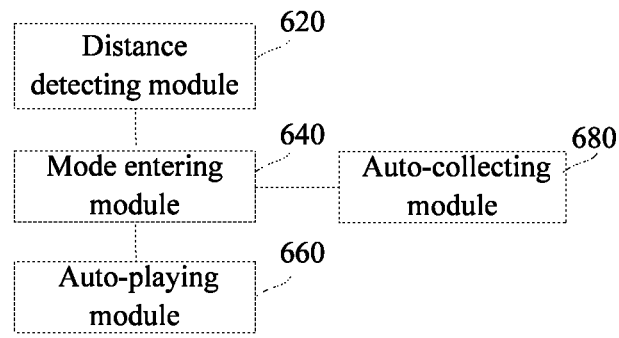
FIG. 6 is a block diagram illustrating the device for voice calling according to an exemplary embodiment.

FIG. 6 is a block diagram illustrating the device for voice calling according to an exemplary embodiment. The device for voice calling may be implemented as a whole or a part of a terminal by using software, hardware or by combining both software and hardware. The device for voice calling includes: a distance detecting module 620, a mode entering module 640, an auto-playing module 660 and an auto-collecting module 680.

The distance detecting module 620 is configured to detect whether a sensed distance value of an on-site terminal is smaller than a preset threshold.

The mode entering module 640 is configured to enter a predetermined call mode when the distance detecting module 620 detects that the sensed distance value is smaller than the preset threshold.

The auto-playing module 660 is configured to auto-play a voice signal of an opposite terminal in the predetermined call mode.

The auto-collecting module 680 is configured to, when a voice signal of the on-site terminal is detected in the predetermined call mode, collect the voice signal of the on-site terminal and transmit the voice signal of the on-site terminal to the opposite terminal.

In summary, in the device for voice calling provided by the present embodiment, by entering the predetermined call mode when detecting that the sensed distance value is smaller than the preset threshold; auto-playing the voice signal of the opposite terminal in the predetermined call mode; and when the voice signal of the on-site terminal is detected in the predetermined call mode, collecting the voice signal of the on-site terminal, and transmitting the voice signal of the on-site terminal to the opposite terminal, the problem that the user can not smoothly use the network interphone when it is inconvenient for the user to perform a press operation or a click operation on the terminal is solved, the effects that voice playing and voice collecting of the network interphone can be automatically triggered as long as the user puts the terminal close to his ear, and the network interphone can be used without any other operation are achieved, and a user experience of an approximate two-way conversation can be obtained.

Figure 7:
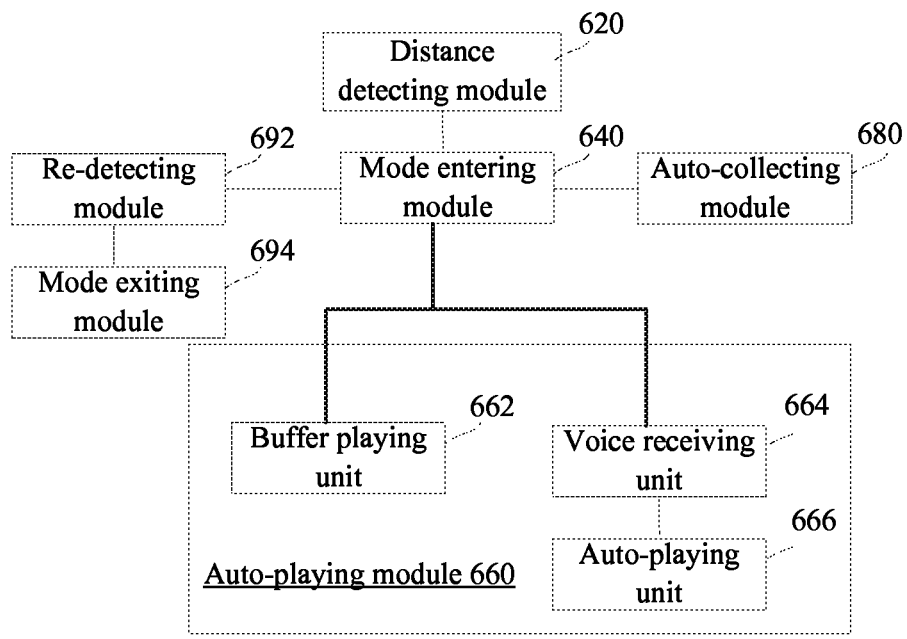
FIG. 7 is a block diagram illustrating the device for voice calling according to another exemplary embodiment.

FIG. 7 is a diagram illustrating the device for voice calling according to another exemplary embodiment. The device for voice calling may be implemented as a whole or a part of a terminal by using software, hardware or by combining both software and hardware. The device for voice calling includes: a distance detecting module 620, a mode entering module 640, an auto-playing module 660 and an auto-collecting module 680.

The distance detecting module 620 is configured to detect whether a sensed distance value in front of a terminal of an on-site terminal is smaller than a preset threshold.

The mode entering module 640 is configured to enter a predetermined call mode when the distance detecting module 620 detects that the sensed distance value is smaller than the preset threshold.

The auto-playing module 660 is configured to auto-play a voice signal of an opposite terminal in the predetermined call mode.

The auto-collecting module 680 is configured to, when a voice signal of the on-site terminal is detected in the predetermined call mode, collect the voice signal of the on-site terminal, and transmit the voice signal of the on-site terminal to the opposite terminal.

The auto-playing module 660 includes:
a buffer playing unit 662 configured to auto-play the voice signal of the opposite terminal that has been received but not yet played in the predetermined call mode;
or,
a voice receiving unit 664 configured to receive the voice signal of the opposite terminal in the predetermined call mode; and an auto-playing unit 666 configured to auto-play the received voice signal of the opposite terminal.

The auto-playing unit 666 includes: a collection detecting sub-unit, a signal buffering sub-unit, a completion detecting sub-unit and a buffer playing sub-unit.

The collection detecting sub-unit is configured to detect whether the auto-collecting module is collecting the voice signal of the on-site terminal after receiving the voice signal of the opposite terminal.

The signal buffering sub-unit is configured to buffer the voice signal of the opposite terminal when the collection detecting sub-unit detects that the voice signal of the on-site terminal is being collected.

The completion detecting sub-unit is configured to detect whether the voice signal of the on-site terminal has been collected completely. The completion detecting sub-unit is configured to detect whether the voice signal of the on-site terminal has been collected completely and whether a time length elapsed after the collection has been completed reaches a preset time length.

The buffer playing sub-unit is configured to auto-play the buffered voice signal of the opposite terminal when the completion detecting sub-unit detects that the voice signal of the on-site terminal has been collected completely.

The voice receiving unit 664 includes: a text receiving sub-unit and a voice synthesizing sub-unit.

The text receiving sub-unit is configured to receive a text information of the opposite terminal in the predetermined call mode.

The voice synthesizing sub-unit is configured to synthesize a voice signal of the opposite terminal according to the text information of the opposite terminal.

The auto-collecting module 680 is configured to, when the auto-playing module 660 is playing the voice signal of the opposite terminal and the voice signal of the on-site terminal is detected, collect the voice signal of the on-site terminal, and transmit the voice signal of the on-site terminal to the opposite terminal.

The device further includes: a re-detecting module 692 and a mode exiting module 694.

The re-detecting module 692 is configured to detect whether a sensed distance value of the on-site terminal is greater than the preset threshold after the mode entering module 640 enters the predetermined call mode.

The mode exiting module 694 is configured to exit from the predetermined call mode when the re-detecting module 692 detects that the sensed distance value is greater than the preset threshold.

In summary, in the device for voice calling provided by the present embodiment, by entering the predetermined call mode when detecting that the sensed distance value is smaller than the preset threshold; auto-playing the voice signal of the opposite terminal in the predetermined call mode; and when the voice signal of the on-site terminal is detected in the predetermined call mode, collecting the voice signal of the on-site terminal, and transmitting the voice signal of the on-site terminal to the opposite terminal, the problem that the user can not smoothly use the network interphone when it is inconvenient for the user to perform a press operation or a click operation on the terminal is solved, the effects that voice playing and voice collecting of the network interphone can be automatically triggered as long as the user puts the terminal close to his ear, and the network interphone can be used without any other operation are achieved, and a user experience of an approximate two-way conversation can be obtained.

In the device for voice calling provided by the present embodiment, by synthesizing the received text information of the opposite terminal into the voice signal of the opposite terminal and playing it, even the opposite terminal sends the text information, it still enable a user to obtain a user experience of an approximate two-way conversation, and the whole process does not require the user's other operations, thus improving communication efficiency.

In the device for voice calling provided by the present embodiment, by buffering the voice signal of the opposite terminal and/or the synthesized voice signal of the opposite terminal when collecting the voice signal of the on-site terminal; and playing the buffered voice signal of the opposite terminal only after the voice signal of the on-site terminal has been collected completely, the user may not be disturbed by any voice of other side when talking, and it is also ensured that the present embodiment is still a one-way conversation other than a two-way conversation, which may comply with the requirements of the operating agencies.

Figure 8:
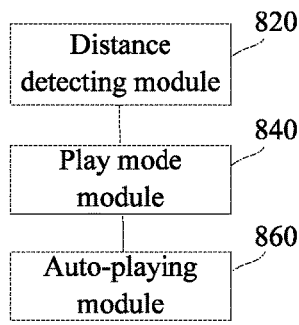
FIG. 8 is a block diagram illustrating the device for voice playing according to an exemplary embodiment.

FIG. 8 is a block diagram illustrating the device for voice playing according to an exemplary embodiment. The device for voice playing may be implemented as a whole or a part of a terminal by using software, hardware or by combining both software and hardware. The device for voice playing includes:

a distance detecting module 820 configured to detect whether a sensed distance value of an on-site terminal is smaller than a preset threshold;

a play mode module 840 configured to enter a predetermined play mode when the distance detecting module 820 detects that the sensed distance value is smaller than the preset threshold; and an auto-playing module 860 configured to auto-play the voice signal of the opposite terminal in the predetermined play mode.

In summary, in the device for voice playing provided by the present embodiment, by entering the predetermined play mode when it is detected that the sensed distance value is smaller than the preset threshold, and auto-playing the voice signal of the opposite terminal in the predetermined play mode, the problem that the user can not smoothly use the network interphone when it is inconvenient for the user to perform a press operation or a click operation on the terminal is solved, and the effect that voice playing of the network interphone can be automatically triggered as long as the user puts the terminal close to his ear is achieved.

Figure 9:
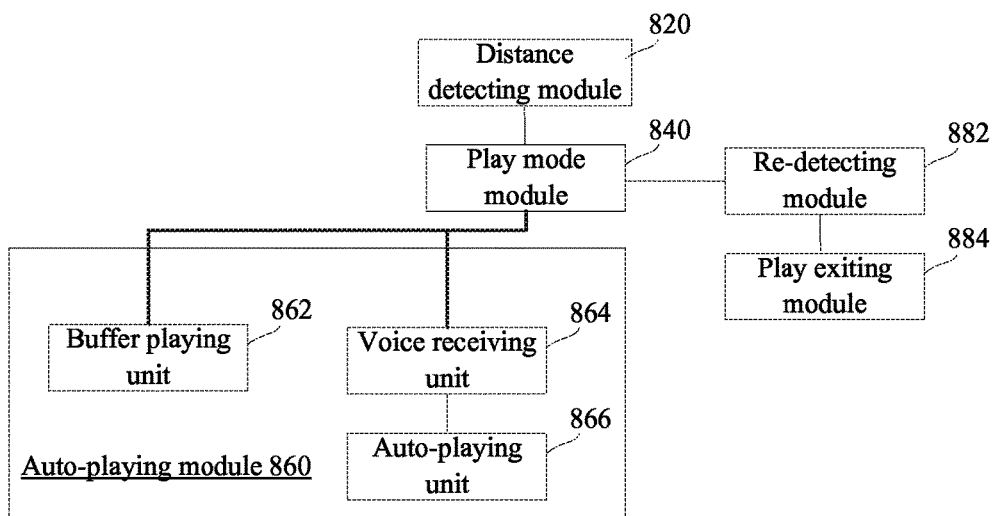
FIG. 9 is a block diagram illustrating the device for voice playing according to another exemplary embodiment.

FIG. 9 is a block diagram illustrating the device for voice playing according to another exemplary embodiment. The device for voice playing may be implemented as a whole or a part of a terminal by using software, hardware or by combining both software and hardware. The device for voice playing includes:

a distance detecting module 820 configured to detect whether a sensed distance value of an on-site terminal is smaller than a preset threshold;

a play mode module 840 configured to enter a predetermined play mode when the distance detecting module 820 detects that the sensed distance value is smaller than the preset threshold; and an auto-playing module 860 configured to auto-play a voice signal of an opposite terminal in the predetermined play mode.

The auto-playing module 860 includes:

a buffer playing unit 862 configured to auto-play the voice signal of the opposite terminal that has been received but not yet played in the predetermined play mode; or, a voice receiving unit 864 configured to receive the voice signal of the opposite terminal in the predetermined play mode; and an auto-playing unit 866 configured to auto-play the received voice signal of the opposite terminal.

The voice receiving unit 864 includes: a text receiving sub-unit and a voice synthesizing sub-unit.

The text receiving sub-unit is configured to receive a text information of the opposite terminal in the predetermined play mode.

The voice synthesizing sub-unit is configured to synthesize a voice signal of the opposite terminal according to the text information of the opposite terminal.

The device further includes: a re-detecting module 882 and a play exiting module 884.

The re-detecting module 882 is configured to detect whether the sensed distance value of the on-site terminal is greater than the preset threshold after the play mode module 840 enters the predetermined play mode.

The play exiting module 884 is configured to exit from the predetermined play mode when the re-detecting module 882 detects that the sensed distance value is greater than the preset threshold.

In summary, in the device for voice playing provided by the present embodiment, by entering the predetermined play mode when detecting that the sensed distance value is smaller than the preset threshold, and auto-playing the voice signal of the opposite terminal when receiving the voice signal of the opposite terminal in the predetermined play mode, the problem that the user can not smoothly use the network interphone when it is inconvenient for the user to perform a press operation or a click operation on the terminal is solved, and the effect that voice playing of the network interphone can be automatically triggered as long as the user puts the terminal close to his ear is achieved.

In the device for voice playing provided by the present embodiment, by synthesizing the received text information of the opposite terminal into the voice signal of the opposite terminal so as to play it, even the opposite terminal sends the text information, it still enable a user to obtain a user experience of an approximate two-way conversation, and the whole process does not require the user's other operations, thus improving communication efficiency.

In the devices in the above embodiments, the specific mode of performing operation for each module has been described in detail in the method embodiments, which will not be described herein.

Figure 10:
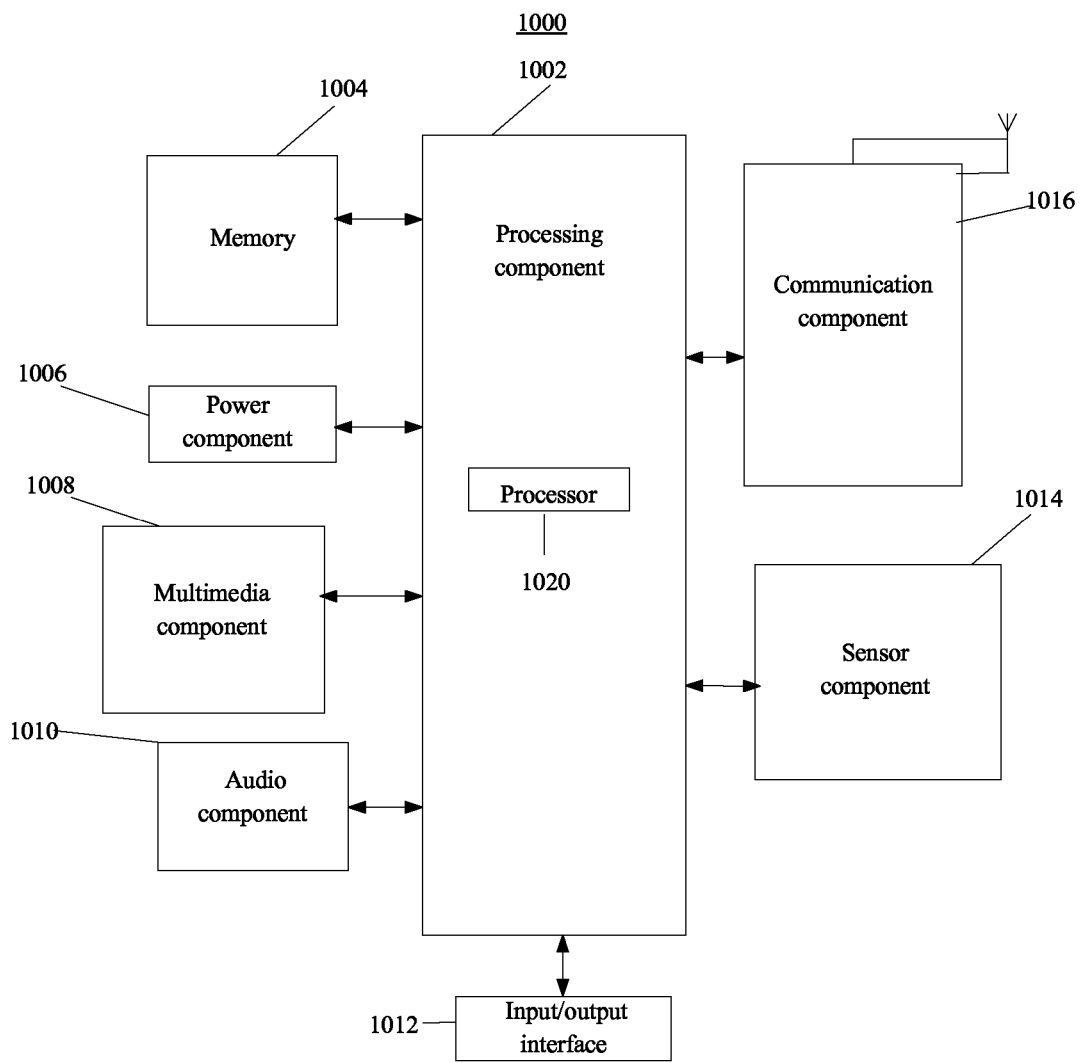
FIG. 10 is a block diagram illustrating the terminal according to an exemplary embodiment of the present disclosure.

FIG. 10 is a block diagram illustrating a terminal according to an exemplary embodiment of the present disclosure. The terminal 1000 may include one or more of the following components: a processing component 1002, a memory 1004, a power component 1006, a multimedia component 1008, an audio component 1010, an input/output (I/O) interface 1012, a sensor component 1014, and a communication component 1016.

The processing component 1002 typically controls overall operations of the terminal 1000, such as the operations associated with display, telephone calls, data communications, camera operations, and recording operations. The processing component 1002 may include one or more processors 1020 to execute instructions to perform all or part of the steps in the above described methods. Moreover, the processing component 1002 may include one or more modules which facilitate the interaction between the processing component 1002 and other components. For instance, the processing component 1002 may include a multimedia module to facilitate the interaction between the multimedia component 1008 and the processing component 1002.

The memory 1004 is configured to store various types of data to support the operation of the terminal 1000. Examples of such data include instructions for any applications or methods operated on the terminal 1000, contact data, phonebook data, messages, pictures, video, etc. The memory 1004 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or an optical disk.

The power component 1006 provides power to various components of the terminal 1000. The power component 1006 may include a power management system, one or more power sources, and any other components associated with the generation, management, and distribution of power for the terminal 1000.

The multimedia component 1008 includes a screen providing an output interface between the terminal 1000 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1008 includes a front camera and/or a rear camera. The front camera and/or the rear camera may receive an external multimedia datum while the terminal 1000 is in an operation mode, such as a photographing mode or a video mode. Each of the front camera and the rear camera may be a fixed optical lens system or have focus and optical zoom capability.

The audio component 1010 is configured to output and/or input audio signals. For example, the audio component 1010 includes a microphone ("MIC") configured to receive an external audio signal when the terminal 1000 is in an operation mode, such as a call mode, a recording mode, and a voice recognition mode. The received audio signal may be further stored in the memory 1004 or transmitted via the communication component 1016. In some embodiments, the audio component 1010 further includes a speaker to output audio signals.

The I/O interface 1012 provides an interface between the processing component 1002 and peripheral interface modules, such as a keyboard, a click wheel, buttons, and the like. The buttons may include, but are not limited to, a home button, a volume button, a starting button, and a locking button.

The sensor component 1014 includes one or more sensors to provide status assessments of various aspects of the terminal 1000. For instance, the sensor component 1014 may detect an open/closed status of the terminal 1000, relative positioning of components, e.g., the display and the keypad, of the terminal 1000, a change in position of the terminal 1000 or a component of the terminal 1000, a presence or absence of user contact with the terminal 1000, an orientation or an acceleration/deceleration of the terminal 1000, and a change in temperature of the terminal 1000. The sensor component 1014 may include a proximity sensor configured to detect the presence of nearby objects without any physical contact. The sensor component 1014 may also include a light sensor, such as a CMOS or CCD image sensor, for use in imaging applications. In some embodiments, the sensor component 1014 may also include an accelerometer sensor, a gyroscope sensor, a magnetic sensor, a pressure sensor, or a temperature sensor.

The communication component 1016 is configured to facilitate communication, wired or wirelessly, between the terminal 1000 and other devices. The terminal 1000 can access a wireless network based on a communication standard, such as WiFi, 2G, or 3G, or a combination thereof. In one exemplary embodiment, the communication component 1016 receives a broadcast signal or broadcast associated information from an external broadcast management system via a broadcast channel. In one exemplary embodiment, the communication component 1016 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the terminal 1000 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 1004, executable by the processor 1020 in the terminal 1000, for performing the above-described methods. For example, the non-transitory computer-readable storage medium may be a ROM, a RAM, a CD-ROM, a magnetic tape, a floppy disc, an optical data storage device, and the like.

There is a non-transitory computer-readable storage medium, when the instructions in the storage medium are executed by a processor of the terminal, the terminal is enabled to perform the methods for voice calling as shown in FIG. 2 or FIG. 3, or perform the methods for voice playing as shown in FIG. 4 or FIG. 5.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for voice processing, comprising:
  receiving, by an on-site terminal, a voice signal from an opposite terminal;
  storing, by the on-site terminal, the voice signal in a buffer memory as the voice signal continues to be received in real-time;
  withholding playing of the voice signal while the voice signal is being stored into the buffer memory and while the on-site terminal is not entered into a predetermined mode;
  directly measuring, by a distance sensor installed on the on-site terminal, a sensed distance value measuring a distance between a display screen of the on-site terminal and a user, wherein the distance sensor is installed adjacent to the display screen such that the user is in a line of sight of the distance sensor and the display screen is facing the user;
  determining, by the on-site terminal, whether the sensed distance value is less than a preset threshold;
  entering, by the on-site terminal, the predetermined mode when the sensed distance value is determined to be less than the preset threshold;
  detecting, by the on-site terminal, a stoppage in receiving the voice signal;
  determining, by the on-site terminal, the voice signal has been collected completely based on the stoppage in receiving the voice signal; and
  auto-playing, through a speaker installed on the on-site terminal, the voice signal from the buffer memory in response to entering the predetermined mode and one of determining the voice signal has been collected completely, or as the voice signal is being received from the opposite terminal.

2. The method of claim 1, further comprising:
  if a voice signal of the on-site terminal is detected in the predetermined mode, collecting the voice signal of the on-site terminal, and transmitting the voice signal of the on-site terminal to the opposite terminal.

3. The method of claim 1, wherein determining the voice signal has been collected completely comprises: detecting whether a preset length of time has elapsed after detecting the stoppage in receiving the voice signal.

4. The method of claim 1, wherein the receiving the voice signal of the opposite terminal in the predetermined mode comprises:
  receiving text information of the opposite terminal in the predetermined mode; and
  synthesizing the voice signal according to the text information of the opposite terminal.

5. The method of claim 2, wherein the collecting the voice signal of the on-site terminal, and transmitting the voice signal of the on-site terminal to the opposite terminal when the voice signal of the on-site terminal is detected in the predetermined mode, comprises:
  if the voice signal of the on-site terminal is detected when playing the voice signal of the opposite terminal, collecting the voice signal of the on-site terminal, and transmitting the voice signal of the on-site terminal to the opposite terminal.

6. The method of claim 2, further comprising:
  receiving a prompt information sent from the opposite terminal, the prompt information prompting that the opposite terminal has entered the predetermined mode; and
  displaying the prompt information.

7. The method of claim 1, further comprising:
  after entering the predetermined mode, detecting whether the sensed distance value of the on-site terminal is greater than the preset threshold; and
  if the sensed distance value of the on-site terminal is greater than the preset threshold, exiting from the predetermined mode.

8. A device for voice calling, comprising:
  a processor;
  a voice receiving unit configured to receive a voice signal from an opposite terminal;
  a distance sensor configured to directly measure a sensed distance value measuring a distance between a display screen of the device and a user, wherein the distance sensor is installed adjacent to the display screen such that the user is in a line of sight of the distance sensor and the display screen is facing the user;
  a memory configured to store the voice signal within a buffer memory portion as the voice signal continues to be received in real-time and store instructions executable by the processor;
  wherein the processor is configured to execute the instructions to:
    withhold playing of the voice signal while the voice signal is being stored into the buffer memory portion and while the device is not entered into a predetermined call mode;
    determine whether the sensed distance value is less than a preset threshold;
    enter the predetermined call mode if the sensed distance value is less than the preset threshold;
    detect a stoppage in receiving the voice signal;
    determine the voice signal has been collected completely based on the stoppage in receiving the voice signal;
    auto-play the voice signal from the buffer memory portion when in the predetermined call mode and one of determining the voice signal has been collected completely, or as the voice signal is being received from the opposite terminal; and
    if a voice signal of the on-site terminal is detected by the device in the predetermined call mode, collect the voice signal of the on-site terminal, and transmit the voice signal of the on-site terminal to the opposite terminal.

9. A device for voice playing, comprising:
a processor;
a voice receiving unit configured to receive a voice signal from an opposite terminal;
a distance sensor configured to directly measure a sensed distance value measuring a distance between a display screen of the device and a user, wherein the distance sensor is installed adjacent to the display screen such that the user is in a line of sight of the distance sensor and the display screen is facing the user;
a memory configured to store the voice signal within a buffer memory portion as the voice signal continues to be received in real-time and store instructions executable by the processor;
wherein the processor is configured to execute the instructions to:
withhold playing of the voice signal while the voice signal is being stored into the buffer memory portion and while the device is not entered into a predetermined play mode;
detect whether the sensed distance value is less than a preset threshold;
enter the predetermined play mode if the sensed distance value is less than the preset threshold;
detect a stoppage in receiving the voice signal;
determine the voice signal has been collected completely based on the stoppage in receiving the voice signal; and
auto-play the voice signal from the buffer memory portion when in the predetermined play mode and one of determining the voice signal has been collected completely, or as the voice signal is being received from the opposite terminal.

10. A non-transitory computer readable storage medium comprising instructions, executable by a processor in a terminal, for performing a method for voice calling, the method comprising:
receiving, by an on-site terminal, a voice signal from an opposite terminal;
storing, by the on-site terminal, the voice signal in a buffer memory as the voice signal continues to be received in real-time;
withholding playing of the voice signal while the voice signal is being stored into the buffer memory and while the on-site terminal is not entered into a predetermined call mode;
directly measuring, by a distance sensor installed on the on-site terminal, a sensed distance value measuring a distance between a display screen of the on-site terminal and a user, wherein the distance sensor is installed adjacent to the display screen such that the user is in a line of sight of the distance sensor and the display screen is facing the user;
determining, by the terminal, whether the sensed distance value is less than a preset threshold;
entering, by the terminal, the predetermined call mode if the sensed distance value is less than the preset threshold;
detecting, by the on-site terminal, a stoppage in receiving the voice signal;
determining, by the on-site terminal, the voice signal has been collected completely based on the stoppage in receiving the voice signal;
auto-playing, through a speaker installed on the on-site terminal, the voice signal from the buffer memory in response to entering the predetermined call mode and one of determining the voice signal has been collected completely, or as the voice signal is being received from the opposite terminal; and
if a voice signal of the terminal is detected in the predetermined call mode, collecting the voice signal of the terminal, and transmitting the voice signal of the terminal to the opposite terminal.

11. A non-transitory computer readable storage medium comprising instructions, executable by a processor in a terminal, for performing a method for voice calling, the method comprising:
receiving, by an on-site terminal, a voice signal from an opposite terminal;
storing, by the on-site terminal, the voice signal in a buffer memory as the voice signal continues to be received in real-time;
directly measuring whether a sensed distance value between the terminal and a user facing a display screen of the terminal is less than a preset threshold;
if the sensed distance value is less than the preset threshold, entering a predetermined play mode;
detecting, by the on-site terminal, a stoppage in receiving the voice signal;
determining, by the on-site terminal, the voice signal has been collected completely based on the stoppage in receiving the voice signal; and
auto-playing a voice signal from the buffer memory of an opposite terminal when in the predetermined play mode and one of determining the voice signal has been collected completely, or as the voice signal is being received from the opposite terminal.

* * * * *